United States Patent
Eifert et al.

(10) Patent No.: US 9,982,676 B2
(45) Date of Patent: *May 29, 2018

(54) SPLIT AXIAL-CENTRIFUGAL COMPRESSOR

(71) Applicants: Rolls-Royce North American Technologies, Inc., Indianapolis, IN (US); Rolls-Royce Corporation, Indianapolis, IN (US)

(72) Inventors: Andrew J. Eifert, Indianapolis, IN (US); Craig E. Heathco, Greenwood, IN (US); Robert W. Cedoz, Indianapolis, IN (US); Robert T. Duge, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/857,193

(22) Filed: Sep. 17, 2015

(65) Prior Publication Data

US 2016/0201682 A1    Jul. 14, 2016

Related U.S. Application Data

(60) Provisional application No. 62/081,332, filed on Nov. 18, 2014.

(51) Int. Cl.

| | | |
|---|---|---|
| *F01D 25/24* | (2006.01) | |
| *F04D 17/12* | (2006.01) | |
| *F02C 3/107* | (2006.01) | |
| *F02C 3/08* | (2006.01) | |
| *F02C 7/06* | (2006.01) | |
| *F04D 17/02* | (2006.01) | |
| *F04D 25/02* | (2006.01) | |

(52) U.S. Cl.
CPC ............ *F04D 17/12* (2013.01); *F02C 3/08* (2013.01); *F02C 3/107* (2013.01); *F02C 7/06* (2013.01); *F04D 17/025* (2013.01); *F04D 25/028* (2013.01); *F05D 2240/52* (2013.01); *F05D 2260/40311* (2013.01)

(58) Field of Classification Search
CPC ...... F04D 13/028; F04D 13/12; F04D 17/025; F04D 17/10; F04D 17/12; F04D 19/026; F04D 25/028; F04D 29/041; F04D 29/051; F05D 2240/52; F05D 2260/40311; F02C 3/08; F02C 3/107
See application file for complete search history.

(56) References Cited

U.S. PATENT DOCUMENTS

| | | | |
|---|---|---|---|
| 3,152,443 A * | 10/1964 | Newland | B64D 35/00 60/791 |
| 3,182,898 A | 5/1965 | Hewson | |
| 3,357,176 A | 12/1967 | Williams | |

(Continued)

*Primary Examiner* — Ninh H Nguyen
(74) *Attorney, Agent, or Firm* — Barnes & Thornburg LLP

(57) ABSTRACT

A gas turbine engine including a compressor, a turbine, and a transmission is disclosed. The turbine is coupled to the compressor to drive rotation of multiple stages of the compressor. The transmission is configured to transmit rotational power from the turbine to at least one stage of the compressor to drive rotation of the at least one stage of the compressor.

13 Claims, 2 Drawing Sheets

(56) References Cited

U.S. PATENT DOCUMENTS

| | | | |
|---|---|---|---|
| 3,546,880 A | 12/1970 | Schwaar | |
| 3,754,484 A * | 8/1973 | Roberts | F16H 1/28 |
| | | | 416/160 |
| 3,971,208 A * | 7/1976 | Schwent | F02C 9/32 |
| | | | 60/226.1 |
| 4,064,690 A | 12/1977 | Kronogard | |
| 4,147,473 A | 4/1979 | Bufalov et al. | |
| 4,214,440 A * | 7/1980 | Rucker | F02C 3/04 |
| | | | 60/226.3 |
| 4,219,306 A | 8/1980 | Fujino et al. | |
| 5,611,663 A | 3/1997 | Kotzur | |
| 6,158,210 A | 12/2000 | Orlando | |
| 7,784,260 B2 | 8/2010 | Spalton | |
| 8,083,030 B2 * | 12/2011 | Portlock | F01D 5/022 |
| | | | 184/6 |
| 8,181,442 B2 | 5/2012 | Youssef | |
| 8,209,952 B2 | 7/2012 | Ress, Jr. | |
| 8,231,341 B2 * | 7/2012 | Anderson | F02C 3/08 |
| | | | 415/181 |
| 8,337,148 B2 | 12/2012 | Staubach et al. | |
| 8,561,383 B2 | 10/2013 | Suciu et al. | |
| 9,752,500 B2 | 9/2017 | Ullyott et al. | |
| 2010/0000198 A1 | 1/2010 | Talan | |
| 2010/0037623 A1* | 2/2010 | Jewess | F02C 3/05 |
| | | | 60/770 |
| 2012/0192570 A1 | 8/2012 | McCune et al. | |
| 2013/0000322 A1 | 1/2013 | Silkowski | |
| 2013/0102431 A1 | 4/2013 | Doleschel et al. | |
| 2013/0219859 A1 | 8/2013 | Suciu et al. | |
| 2013/0223984 A1 | 8/2013 | Gehlot et al. | |
| 2016/0138603 A1* | 5/2016 | Eifert | F04D 17/10 |
| | | | 415/122.1 |

* cited by examiner

SPLIT AXIAL-CENTRIFUGAL COMPRESSOR

CROSS REFERENCE TO RELATED APPLICATIONS

This application claims priority to and the benefit of U.S. Provisional Patent Application No. 62/081,332, filed 18 Nov. 2014, the disclosure of which is now expressly incorporated herein by reference.

FIELD OF THE DISCLOSURE

The present disclosure relates generally to gas turbine engines, and more specifically to compressors of gas turbine engines.

BACKGROUND

Gas turbine engines typically include a compressor, a combustor, and a turbine. The compressor compresses air drawn into the engine and delivers high pressure air to the combustor. In the combustor, fuel is mixed with the high pressure air and the air/fuel mixture is ignited. Products of the combustion reaction in the combustor are directed into the turbine where work is extracted to drive various components of the gas turbine engine, such as the compressor.

In some gas turbine engines, multiple stages of the compressor are driven at a single rotational speed by the turbine. Because each stage of the compressor is not driven at its individual optimal rotational speed by the turbine, these gas turbine engines present operating efficiency limitations. In other gas turbine engines, multiple stages of the compressor are driven by separate turbine units at different rotational speeds. Due to the multiple turbine units used to drive each compressor stage, such gas turbine engines present cost and complexity limitations. In still other gas turbine engines, multiple stages of the compressor are driven by separate turbine units at different rotational speeds, and one of the rotational speeds is dependent upon the rotational speed of the output shaft of the gas turbine engine. Such gas turbine engines present stability problems that may necessitate additional features that increase cost and/or reduce operating efficiency of the gas turbine engines.

SUMMARY

The present disclosure may comprise one or more of the following features and combinations thereof.

A gas turbine engine may include a compressor, a turbine, and a transmission. The compressor may include an axial compression stage and a centrifugal compression stage arranged aft of the axial compression stage along an engine axis. The turbine may be arranged aft of the centrifugal compression stage and coupled to the compressor to drive rotation of the axial compression stage and the centrifugal compression stage about the engine axis. The transmission may be coupled to the turbine and the compressor and configured to transmit rotational power generated by the turbine about the engine axis to at least one of the axial compression stage and the centrifugal compression stage to drive rotation of at least one of the axial compression stage and the centrifugal compression stage at a first speed offset from a turbine speed. The axial compression stage may have an outlet radius and the centrifugal compression stage may have an inlet radius that is about equal to the outlet radius of the axial compression stage to facilitate a smooth transition of air from the axial compression stage to the centrifugal compression stage.

In some embodiments, the centrifugal compression stage may be coupled to the turbine for common rotation therewith about the engine axis, and the axial compression stage may be coupled to the turbine through the transmission for rotation about the engine axis at the first speed offset from the turbine speed. The transmission may include a first planetary gear set arranged forward of the axial compression stage about the engine axis. The gas turbine engine may include a thrust bearing supporting the first planetary gear set and arranged forward of the axial compression stage.

In some embodiments, the axial compression stage may be coupled to the turbine for common rotation therewith about the engine axis, and the centrifugal compression stage may be coupled to the turbine through the transmission for rotation about the engine axis at the first speed offset from the turbine speed. The transmission may include a first planetary gear set arranged aft of the centrifugal compression stage about the engine axis. The gas turbine engine may include a thrust bearing supporting the first planetary gear set and arranged aft of the centrifugal compression stage.

In some embodiments, the axial compression stage may be coupled to the turbine through the transmission for rotation about the engine axis at the first speed offset from the turbine speed, and the centrifugal compression stage may be coupled to the turbine through the transmission for rotation about the engine axis at a second speed offset from the first speed and the turbine speed. The transmission may include a first planetary gear set arranged forward of the axial compression stage about the engine axis, and a second planetary gear set arranged aft of the centrifugal compression stage about the engine axis. The gas turbine engine may include a first thrust bearing supporting the first planetary gear set and arranged forward of the axial compression stage, and a second thrust bearing supporting the second planetary gear set and arranged aft of the centrifugal compression stage.

According to another aspect of the present disclosure, a compressor may include an axial compression stage, a centrifugal compression stage, and a transmission. The axial compression stage may have an axial inlet and an axial outlet. The centrifugal compression stage may have a centrifugal inlet and a centrifugal outlet. The transmission may be adapted to receive rotational power and distribute the rotational power between the axial compression stage and the centrifugal compression stage. The transmission may include an input shaft and a first gear set. The first gear set may be coupled between the input shaft and one of the axial compression stage and the centrifugal compression stage. The centrifugal inlet may be arranged to receive compressed air discharged from the axial outlet. The centrifugal inlet may have a first area, the axial outlet may have a second area, and the first area may be about equal to the second area.

In some embodiments, the first gear set may be a planetary gear set arranged forward of the axial compression stage. The compressor may include a thrust bearing supporting the first gear set and arranged forward of the axial compression stage. Additionally, in some embodiments, the first gear set may include a helical gear.

In some embodiments, the axial compression stage may be arranged forward of the centrifugal compression stage, and the first gear set may be arranged aft of the centrifugal compression stage. Additionally, in some embodiments, the transmission may include a second gear set coupled between the input shaft and the other of the axial compression stage and the centrifugal compression stage. Each of the first and second gear sets may be a planetary gear set. The compressor may include a first thrust bearing supporting the first gear set, and a second thrust bearing supporting the second gear set.

In some embodiments, a ring gear of the first gear set may be constrained against rotation about an axis. Additionally, in some embodiments, a carrier of the first gear set may be constrained against rotation about an axis.

These and other features of the present disclosure will become more apparent from the following description of the illustrative embodiments.

DETAILED DESCRIPTION OF THE DRAWINGS

Figure 1:
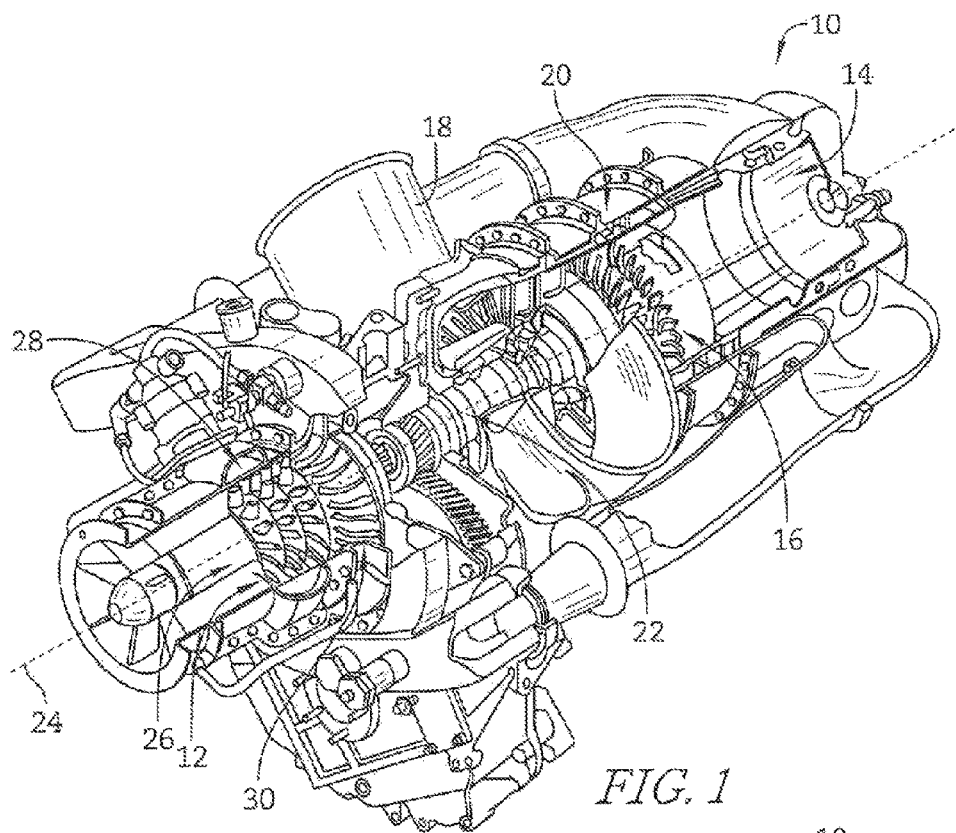
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

Referring now to FIG. 1, a cut-away view of an illustrative aerospace gas turbine engine 10 is shown. The gas turbine engine 10 includes a compressor 12, a combustor 14, a turbine 16, and an exhaust 18, each of which is supported by a metallic case 20. The compressor 12 compresses and delivers air to the combustor 14. The combustor 14 mixes the compressed air with fuel, ignites the air/fuel mixture, and delivers the combustion products (i.e., hot, high-pressure gases) to the turbine 16. The turbine 16 converts the combustion products to mechanical energy (i.e., rotational power) that drives, among other things, the compressor 12. The exhaust 18 discharges the used combustion products to the atmosphere.

Rotating components of the compressor 12 and the turbine 16 are mounted on a shaft 22 as shown in FIG. 1. The compressor 12 and the turbine 16 are coupled to one another through the shaft 22 so that the power extracted by the turbine 16 is transmitted to the compressor 12 via the shaft 22. The shaft 22 defines an engine axis 24 along which each of the compressor 12, the combustor 14, and the turbine 16 are arranged as shown in FIG. 1. The turbine 16 is arranged aft of the compressor 12 along the axis 24. In the illustrative embodiment, both the turbine 16 and the compressor 12 are arranged forward of the combustor 14 along the axis 24 as shown in FIG. 1.

Figure 2:
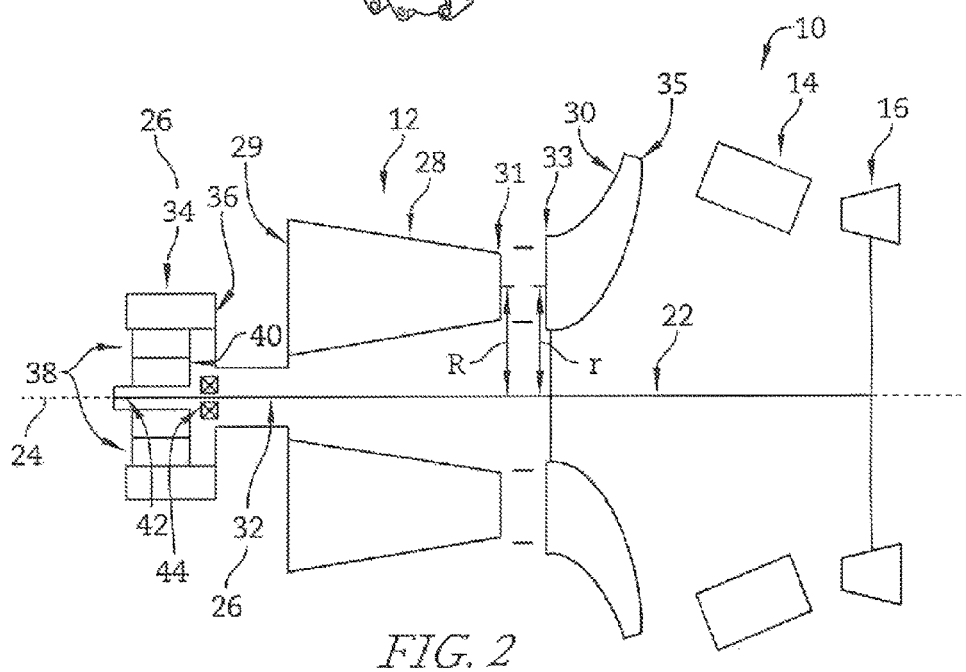
FIG. 2 is a diagrammatic view of the gas turbine engine of FIG. 1 showing axial and centrifugal stages of a compressor of the gas turbine engine and a transmission of the gas turbine engine arranged along an engine axis.

The gas turbine engine 10 further includes a transmission 26 that is positioned along the engine axis 24 as shown in FIG. 1. As best seen in FIG. 2, the transmission 26 is coupled to the turbine 16 and the compressor 12 via the shaft 22. The transmission 26 is configured to transmit rotational power generated by the turbine 16 about the engine axis 24 to at least one stage of the compressor 12. As a result, at least one stage of the compressor 12 is driven by the turbine 16 through the transmission 26 to rotate at a first speed offset from a rotational speed of the turbine 16 (i.e., a "turbine speed"). In this way, the transmission 26 is adapted to receive rotational power from the turbine 16 and distribute the rotational power between multiple stages of the compressor 12.

The compressor 12 illustratively includes a plurality of axial compression stages 28 and a centrifugal compression stage 30 arranged aft of the axial compression stages 28 along the axis 24 as shown in FIG. 2. Air compressed by the axial compression stages 28 is delivered to the centrifugal compression stage 30 for further compression. Air compressed by the centrifugal compression stage 30 is then delivered to the combustor 14.

The turbine 16 is coupled to the axial compression stages 28 and the centrifugal compression stage 30 through the shaft 22 to drive rotation of the axial stages 28 and the centrifugal stage 30 as suggested in FIG. 2. In the illustrative embodiment, the centrifugal compression stage 30 is directly driven by the shaft 22 at the turbine speed. The axial stages 28 are indirectly driven by the shaft 22 through the transmission 26 such that the turbine 16 drives rotation of the axial stages 28 at the first speed offset from the turbine speed.

The axial compression stages 28 have an axial inlet 29 and an axial outlet 31 arranged opposite the axial inlet 29 as shown diagrammatically in FIG. 2. The axial outlet 31 illustratively has a radius R measured from the axis 24 as shown in FIG. 2, and the axial outlet 31 has a first area. The centrifugal compression stage 30 has a centrifugal inlet 33 and a centrifugal outlet 35 arranged opposite the centrifugal inlet 33. The centrifugal inlet 33 illustratively has a radius r measured from the axis 24 as shown in FIG. 2, and the centrifugal inlet 33 has a second area. The centrifugal inlet 33 is arranged to receive compressed air discharged from the axial outlet 31.

The axial outlet 31 radius R is about equal to the centrifugal inlet 33 radius r as shown in FIG. 2. In the illustrative embodiment, the first area of the axial outlet 31 is about equal to the second area of the centrifugal inlet 33. As such, the axial outlet 31 and the centrifugal inlet 33 cooperate to facilitate a smooth transition of air from the aft-most axial compression stage 28 to the centrifugal compression stage 30. The smooth transition of air from the aft-most axial stage 28 to the centrifugal stage 30 reduces lost performance within the engine 10 and thereby increases the operating efficiency of the engine 10.

The transmission 26 is illustratively arranged forward of the axial compression stages 28 along the axis 24 as shown in FIG. 2. The axial compression stages 28 are coupled to the turbine 16 through the transmission 26 for rotation about the engine axis 24 at the first speed offset from the turbine speed. The centrifugal compression stage 30 is coupled to the turbine 16 for common rotation therewith about the engine axis 24 (i.e., at the turbine speed).

The transmission 26 illustratively includes an input 32 and a planetary gear set 34 coupled between the input 32 and the axial compression stages 28 as shown in FIG. 2. The input 32 is illustratively embodied as a portion of the shaft 22 configured to transmit rotational power from the turbine 16 to the gear set 34. As such, the input 32 is referred to herein as the input shaft 32. The planetary gear set 34 is illustratively a simple planetary or epicyclic gear set arranged forward of the axial compression stages 28 along the axis 24. In other embodiments, the planetary gear set 34 may be a compound planetary gear set such as a meshed-planet planetary gear set or a stepped-planet planetary gear set.

The illustrative planetary gear set 34 includes a ring gear 36, a plurality of planet gears 38, a carrier 40, and a sun gear 42 as shown in FIG. 2. Each of the planet gears 38 is intermeshed with the ring gear 36 and the sun gear 42, and each of the planet gears 38 is supported by the carrier 40. The ring gear 36, the planet gears 38, and the sun gear 42 are illustratively helical gears. In other embodiments, the ring gear 36, the planet gears 38, and the sun gear 42 may be straight-toothed gears.

The helical gears of the planetary gear set 34 produce thrust loads parallel to the engine axis 24 during operation of the gas turbine engine 10. To bear the thrust loads produced by the planetary gear set 34, and to support the gear set 34 about the input shaft 32, the gas turbine engine 10 shown in FIG. 2 includes a thrust bearing 44. The thrust bearing 44 may also bear thrust loads parallel to the engine axis 24 produced by other components of the gas turbine engine 10, such as the compressor 12 and the turbine 16. The thrust bearing 44 is illustratively arranged forward of the axial compression stages 28 between the gear set 34 and the input shaft 32 as shown in FIG. 2. The thrust bearing 44 may be a thrust ball bearing, a thrust spherical roller bearing, a thrust cylindrical roller bearing, a thrust tapered roller bearing, or a thrust needle roller bearing, or any other suitable thrust bearing.

In the illustrative arrangement shown in FIG. 2, the thrust bearing 44 may react against the thrust load experienced by certain components of the engine 10 during operation of the engine 10. Specifically, the thrust bearing 44 may absorb thrust loads produced by the gear set 34, the compressor 12, and the turbine 16 that would otherwise be reacted through the shaft 22 to bearings supporting the shaft 22. The operational life of such components, therefore, may be increased as a result of the arrangement of FIG. 2.

During operation of the engine 10, the gear set 34 may produce a thrust load in one direction opposite the direction of a thrust load produced by another component of the engine 10. For instance, the gear set 34 may produce a thrust load in one direction opposite the direction of a thrust load produced by the compressor 12 or the turbine 16. The opposing thrust loads may reduce the overall thrust load reacted through the shaft 22 to the bearings supporting the shaft 22. In this fashion, the thrust load experienced by the bearings supporting the shaft 22 may be reduced.

The planetary gear set 34 may be coupled between the input shaft 32 and the axial compression stages 28 in a variety of configurations so that the transmission 26 drives the axial stages 28 to rotate at the first speed. For instance, in the illustrative configuration shown in FIG. 2, the sun gear 42 is coupled to the input shaft 32, and the ring gear 36 is coupled to the axial stages 28. The carrier 40 is constrained against rotation about the engine axis 24. The illustrative configuration, therefore, is a "star" configuration in which the planet gears 38 do not rotate about the engine axis 24.

In another configuration, the sun gear 42 may be coupled to the input shaft 32, and the carrier 40 may be coupled to the axial stages 28. The ring gear 36 may be constrained against rotation about the engine axis 24. In that way, this configuration is a "planetary" configuration in which the planet gears 38 are permitted to rotate about the engine axis 24.

In yet another configuration, the ring gear 36 may be coupled to the input shaft 32, and the carrier 40 may be coupled to the axial stages 28. The sun gear 42 may be constrained against rotation about the engine axis 24. In that way, this configuration is a "solar" configuration in which the planet gears 38 are permitted to rotate about the engine axis 24.

In each of the configurations discussed above, the first speed at which the transmission 26 drives the axial compression stages 28 to rotate about the engine axis 24 is a fixed ratio relative to the turbine speed. The first speed may vary depending on the configuration used to couple the planetary gear set 34 between the input shaft 32 and the axial compression stages 28. In any case, as indicated above, the first speed is a fixed speed offset from the turbine speed.

Figure 3:
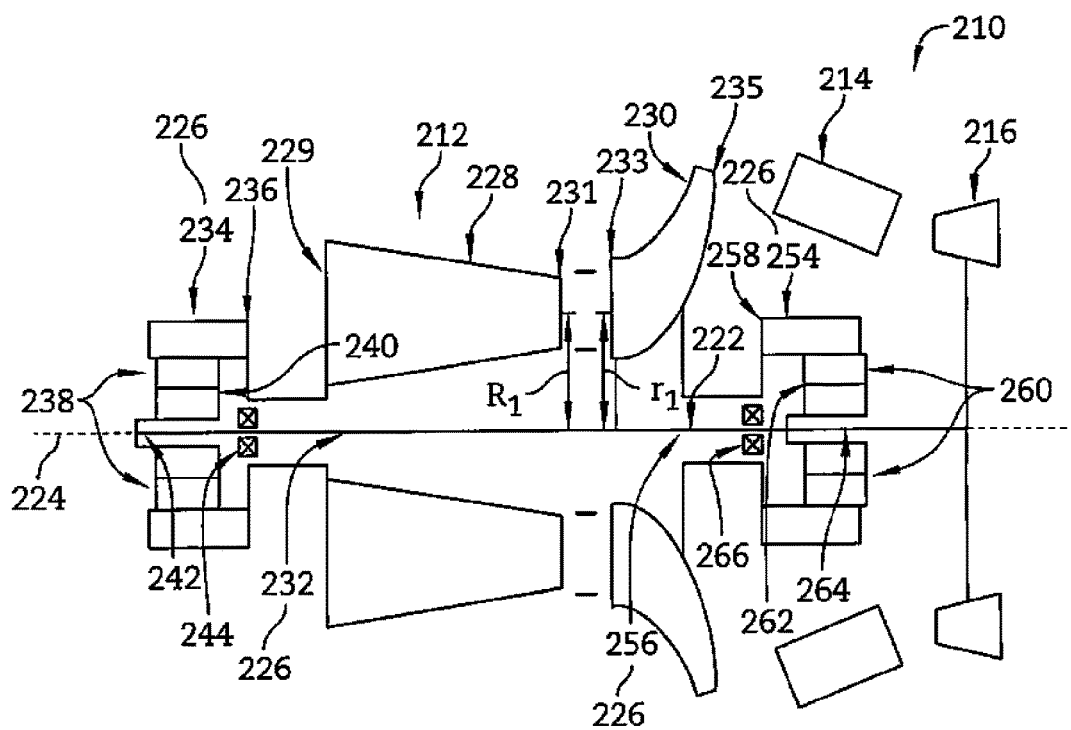
FIG. 3 is a diagrammatic view of another embodiment of a gas turbine engine showing axial and centrifugal stages of a compressor of the gas turbine engine and a transmission of the gas turbine engine arranged along an engine axis.

Referring now to FIG. 3, another embodiment of a gas turbine engine 210 is shown diagrammatically. The gas turbine engine 210 is similar to the gas turbine engine 10 shown in FIGS. 1-2 and described herein. However, unlike the gas turbine engine 10, the gas turbine engine 210 includes a transmission 226 that has a second planetary gear set 254.

The transmission 226 of the engine 210 is configured to transmit rotational power from the turbine 16 to the axial compression stages 28 and the centrifugal compression stage 30 of the compressor 12. The axial compression stages 28 are coupled to the turbine 16 through the transmission 226 for rotation about the axis 24 at a first speed offset from the turbine speed. The centrifugal compression stage 30 is coupled to the turbine 16 through the transmission 226 for rotation about the axis 24 at a second speed offset from the first speed and the turbine speed.

The transmission 226 of the gas turbine engine 210 includes an input 256 and the second planetary gear set 254 as shown in FIG. 3. The second planetary gear set 254 is coupled between the input 256 of the transmission 226 and the centrifugal compression stage 30. The input 256 is illustratively embodied as a portion of the shaft 22 configured to transmit rotational power from the turbine 16 to the gear set 254. As such, the input 256 is referred to herein as the input shaft 256. The planetary gear set 254 is illustratively a simple planetary or epicyclic gear set arranged aft of the centrifugal compression stage 30 along the axis 24. In other embodiments, the planetary gear set 254 may be a compound planetary gear set such as a meshed-planet planetary gear set or a stepped-planet planetary gear set.

The second planetary gear set 254 illustratively includes a ring gear 258, a plurality of planet gears 260, a carrier 262, and a sun gear 264 as shown in FIG. 3. Each of the planet gears 260 is intermeshed with the ring gear 258 and the sun gear 264, and each of the planet gears 260 is supported by the carrier 262. The ring gear 258, the planet gears 260, and the sun gear 264 are illustratively helical gears. In other embodiments, the ring gear 258, the planet gears 260, and the sun gear 264 may be straight-toothed gears.

The helical gears of the planetary gear set 254 produce thrust loads parallel to the engine axis 24 during operation of the gas turbine engine 210. To bear the thrust loads produced by the planetary gear set 254, and to support the gear set 254 about the input shaft 256, the gas turbine engine 210 shown in FIG. 3 includes a thrust bearing 266. The thrust bearing 266 may also bear thrust loads parallel to the engine axis 24 produced by other components of the gas turbine engine 210, such as the turbine 16. The thrust bearing 266 is illustratively arranged aft of the centrifugal compression stage 30 between the planetary gear set 254 and the input shaft 256 as shown in FIG. 3. The thrust bearing 266 may be a thrust ball bearing, a thrust spherical roller bearing, a thrust cylindrical roller bearing, a thrust tapered roller bearing, or a thrust needle roller bearing, or any other suitable thrust bearing.

The planetary gear set 254 may be coupled between the input shaft 256 and the centrifugal compression stage 30 in a variety of configurations so that the transmission 226 drives the centrifugal compression stage 30 to rotate at the second speed. For instance, in the illustrative configuration shown in FIG. 3, the sun gear 264 is coupled to the input shaft 256, and the ring gear 258 is coupled to the centrifugal stage 30. The carrier 262 is constrained against rotation about the engine axis 24. The illustrative configuration, therefore, is a "star" configuration in which the planet gears 260 do not rotate about the engine axis 24.

In another configuration, the sun gear 264 may be coupled to the input shaft 256, and the carrier 262 may be coupled to the centrifugal stage 30. The ring gear 258 may be constrained against rotation about the engine axis 24. In that way, this configuration is a "planetary" configuration in which the planet gears 260 are permitted to rotate about the engine axis 24.

In yet another configuration, the ring gear 258 may be coupled to the input shaft 256, and the carrier 262 may be coupled to the centrifugal stage 30. The sun gear 264 may be constrained against rotation about the engine axis 24. In that way, this configuration is a "solar" configuration in which the planet gears 260 are permitted to rotate about the engine axis 24.

In each of the configurations discussed above, the second speed at which the transmission 226 drives the centrifugal compression stage 30 to rotate about the engine axis 24 is a fixed speed ratio. The second speed may vary depending on the configuration used to couple the planetary gear set 254 between the input shaft 256 and the centrifugal compression stage 30. In any case, as indicated above, the second speed is a fixed speed offset from the first speed and the turbine speed.

Figure 4:
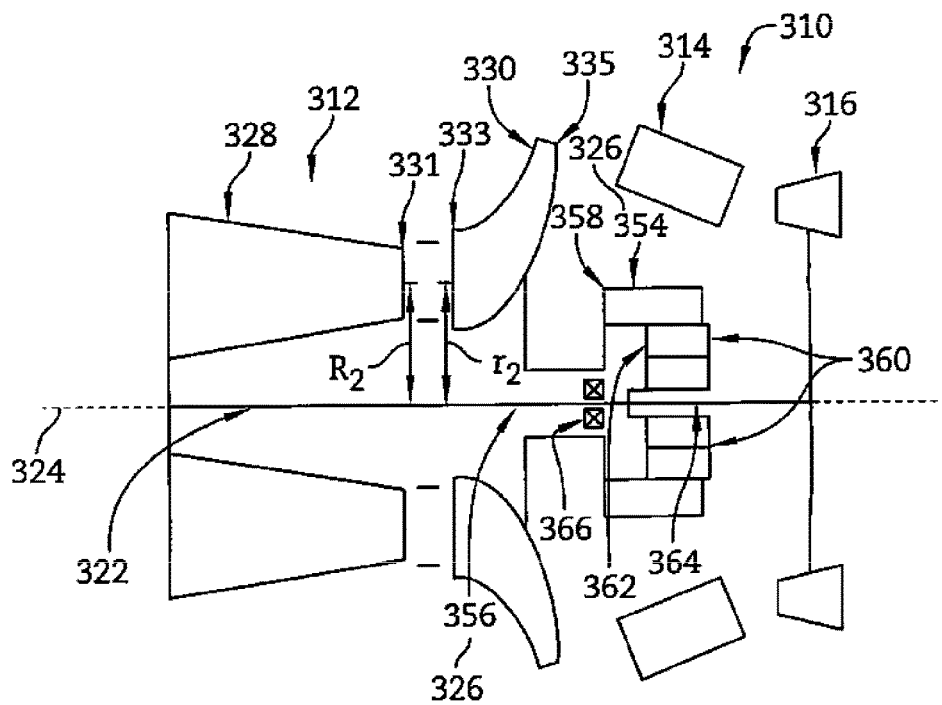
FIG. 4 a diagrammatic view of yet another embodiment of a gas turbine engine showing axial and centrifugal stages of a compressor of the gas turbine engine and a transmission of the gas turbine engine arranged along an engine axis.

Referring now to FIG. 4, yet another embodiment of a gas turbine engine 310 is shown. The gas turbine engine 310 is similar to the gas turbine engine 10 shown in FIGS. 1-2. However, unlike the gas turbine engine 10, the gas turbine engine 310 includes a transmission 326 that offsets the speed of the centrifugal stage 30 from the turbine 16 while allowing the axial stages 28 to be driven with the turbine 16.

The transmission 326 of the engine 310 is configured to transmit rotational power from the turbine 16 to only the centrifugal compression stage 30 while the axial stages 28 are directly driven by the turbine 16. As shown in FIG. 4, the axial compression stages 28 are coupled to the turbine 16 through the shaft 22 for common rotation therewith about the axis 24. The centrifugal compression stage 30 is coupled to the turbine 16 through the transmission 326 for rotation about the axis 24 at the first speed offset from the turbine speed.

The transmission 326 of the gas turbine engine 310 includes an input shaft 356 and a planetary gear set 354 as shown in FIG. 4. The planetary gear set 354 is coupled between the input shaft 356 and the centrifugal compression stage 30. The planetary gear set 354 is illustratively arranged aft of the centrifugal compression stage 30 along the axis 24.

The planetary gear set 354 may be coupled between the input shaft 356 and the centrifugal compression stage 30 in a variety of configurations so that the transmission 326 drives the centrifugal stage 30 to rotate at a first offset speed. For instance, in the illustrative configuration shown in FIG. 4, a sun gear 364 is coupled to the input shaft 356, and a ring gear 358 is coupled to the centrifugal stage 30. A carrier 362 is constrained against rotation about the engine axis 24. The illustrative configuration, therefore, is a "star" configuration in which the planet gears 362 do not rotate about the engine axis 24.

In another configuration, the sun gear 364 may be coupled to the input shaft 356, and the carrier 362 may be coupled to the centrifugal stage 30. The ring gear 358 may be constrained against rotation about the engine axis 24. In that way, this configuration is a "planetary" configuration in which the planet gears 362 are permitted to rotate about the engine axis 24.

In yet another configuration, the ring gear 358 may be coupled to the input shaft 356, and the carrier 362 may be coupled to the centrifugal stage 30. The sun gear 364 may be constrained against rotation about the engine axis 24. In that way, this configuration is a "solar" configuration in which the planet gears 362 are permitted to rotate about the engine axis 24.

In each of the configurations discussed above, the first speed at which the transmission 326 drives the centrifugal compression stage 30 to rotate about the engine axis 24 is a fixed ratio relative to the turbine speed. The first speed may vary depending on the configuration used to couple the planetary gear set 354 between the input shaft 356 and the centrifugal compression stage 30. In any case, as indicated above, the first speed is a fixed speed offset from the turbine speed.

The designs 10, 210, 310 of the present disclosure may improve the efficiency of a gas turbine engine compressor 12. Designs of the present disclosure 10, 210, 310 may be constructed of a forward section of axial stages 28 preceding an aft centrifugal stage 30. The forward stages 28 would operate at a different speed than the centrifugal stage 30 by means of a transmission 26, 226, 326.

The foregoing designs 10, 210, 310 provide a method of improving efficiency and stability for a compressor in a gas turbine engine with a multi-stage compressor with a single speed input that operates various sections of the compressor at different speeds through the use of one or more transmissions.

In some embodiments in which a set of axial compressor stages are used in combination with a centrifugal stage to form a complete compressor section for the engine, the outer radius of the centrifugal stage may be noticeably larger than the outer radii of the axial stages causing problematic flow properties. The optimal or ideal speed of the centrifugal stage may also be significantly different than the optimal or ideal speed of the axial stages, so the engine speed is a compromise such that optimal engine efficiency is not achieved.

In some embodiments, the axial stages and the centrifugal stage may be driven by separate "lower pressure" (LP) and "higher pressure" (HP) turbines. This may permit the compressor stages to operate closer to their optimal or ideal rotation speeds but may also add complexity and cost to the engine. According to the present disclosure, the compressor may be constructed so that the axial stages will rotate at different speeds than the centrifugal stage by means of a single ratio gearbox.

In some axial-centrifugal compressors, the speed is determined such that the axial section, the centrifugal section, or both are operating at a non-optimal speed for maximum efficiency. This may be caused by the aerodynamic shape of the two sections. The centrifugal section may require the input end to be at a significantly smaller radius than the output end such that centrifugal force of the rotation can impart energy into the gas stream and raise the pressure of the gas. To maximize the axial section efficiency, the axial section may match the radius of the input end such that the transition between the two sections has low pressure loss and matches the desired radius of the aerodynamics of the axial stage(s). In the common axial-centrifugal compressor, this may result in either a transition with notable pressure loss, or a combination that optimizes neither the axial compressor nor the transition. The present disclosure may improve the efficiency of the compressor by enabling an optimal axial section and an optimal centrifugal section to be combined with an optimal transition.

The engine 10 shown in FIGS. 1 and 2 constitutes an arrangement with one of more turbine stages driving a centrifugal compressor section with a single centrifugal compressor via a direct speed drive (a shaft section), and driving an axial compressor section via a single speed (single ratio) gear section. The rotational speeds of the sections may vary throughout the operating range of the engine consistent with the shaft and gear arrangement.

The engine 210 shown in FIG. 3 constitutes an arrangement with one of more turbine stages driving a centrifugal compressor section with a single centrifugal compressor via a single speed (single ratio) gear section, and driving an axial compressor section via a single speed (single ratio) gear section. The rotational speeds of the sections may vary throughout the operating range of the engine consistent with the shaft and gear arrangement The engine 310 shown in FIG. 4 constitutes an arrangement with one of more turbine stages driving a centrifugal compressor section with a single centrifugal compressor via a single speed (single ratio) gear section and driving an axial compressor section via a direct speed drive (a shaft section). The rotational speeds of the sections may vary throughout the operating range of the engine consistent with the shaft and gear arrangement.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a compressor including an axial compression stage and a centrifugal compression stage arranged aft of the axial compression stage along an engine axis,
a turbine arranged aft of the centrifugal compression stage and coupled to the compressor to drive rotation of the axial compression stage and the centrifugal compression stage about the engine axis, and
a transmission coupled to the turbine and the compressor, the transmission configured to transmit rotational power generated by the turbine about the engine axis to at least one of the axial compression stage and the centrifugal compression stage to drive rotation of at least one of the axial compression stage and the centrifugal compression stage at a first speed offset from a turbine speed,
wherein (i) the axial compression stage has an outlet radius and the centrifugal compression stage has an inlet radius that is about equal to the outlet radius of the axial compression stage to facilitate a smooth transition of air from the axial compression stage to the centrifugal compression stage, (ii) the centrifugal compression stage is coupled to the turbine for common rotation therewith about the engine axis, and (iii) the axial compression stage is coupled to the turbine through the transmission for rotation about the engine axis at the first speed offset from the turbine speed.

2. The gas turbine engine of claim 1, wherein the transmission comprises a first planetary gear set arranged forward of the axial compression stage about the engine axis.

3. The gas turbine engine of claim 2, further comprising a thrust bearing supporting the first planetary gear set and arranged forward of the axial compression stage.

4. A gas turbine engine comprising
a compressor including an axial compression stage and a centrifugal compression stage arranged aft of the axial compression stage along an engine axis,
a turbine arranged aft of the centrifugal compression stage and coupled to the compressor to drive rotation of the axial compression stage and the centrifugal compression stage about the engine axis, and
a transmission coupled to the turbine and the compressor, the transmission configured to transmit rotational power generated by the turbine about the engine axis to at least one of the axial compression stage and the centrifugal compression stage to drive rotation of at least one of the axial compression stage and the centrifugal compression stage at a first speed offset from a turbine speed,
wherein (i) the axial compression stage has an outlet radius and the centrifugal compression stage has an inlet radius that is about equal to the outlet radius of the axial compression stage to facilitate a smooth transition of air from the axial compression stage to the centrifugal compression stage, (ii) the axial compression stage is coupled to the turbine for common rotation therewith about the engine axis, and (iii) the centrifugal compression stage is coupled to the turbine through the transmission for rotation about the engine axis at the first speed offset from the turbine speed.

5. The gas turbine engine of claim 4, wherein the transmission comprises a first planetary gear set arranged aft of the centrifugal compression stage about the engine axis.

6. The gas turbine engine of claim 5, further comprising a thrust bearing supporting the first planetary gear set and arranged aft of the centrifugal compression stage.

7. A compressor comprising
an axial compression stage having an axial inlet and an axial outlet,
a centrifugal compression stage having a centrifugal inlet and a centrifugal outlet, and
a transmission adapted to receive rotational power and distribute the rotational power between the axial compression stage and the centrifugal compression stage, the transmission including an input shaft and a first gear set, the first gear set coupled between the input shaft and one of the axial compression stage and the centrifugal compression stage,
wherein (i) the centrifugal inlet is arranged to receive compressed air discharged from the axial outlet, (ii) the centrifugal inlet has a first area, (iii) the axial outlet has a second area, (iv) the first area is about equal to the second area, (v) the axial compression stage is arranged forward of the centrifugal compression stage, and (vi) the first gear set is arranged aft of the centrifugal compression stage.

8. The compressor of claim 7, wherein the first gear set includes a helical gear.

9. The compressor of claim 7, wherein a ring gear of the first gear set is constrained against rotation about an axis.

10. The compressor of claim 7, wherein a carrier of the first gear set is constrained against rotation about an axis.

11. A compressor comprising
an axial compression stage having an axial inlet and an axial outlet,
a centrifugal compression stage having a centrifugal inlet and a centrifugal outlet, and
a transmission adapted to receive rotational power and distribute the rotational power between the axial compression stage and the centrifugal compression stage, the transmission including an input shaft and a first gear set, the first gear set coupled between the input shaft and one of the axial compression stage and the centrifugal compression stage,
wherein (i) the centrifugal inlet is arranged to receive compressed air discharged from the axial outlet, (ii) the centrifugal inlet has a first area, (iii) the axial outlet has a second area, (iv) the first area is about equal to the second area, and (v) the transmission further includes a second gear set coupled between the input shaft and the other of the axial compression stage and the centrifugal compression stage.

12. The compressor of claim 11, wherein each of the first and second gear sets is a planetary gear set.

13. The compressor of claim 12, further comprising (i) a first thrust bearing supporting the first gear set and (ii) a second thrust bearing supporting the second gear set.

* * * * *